United States Patent
Le Devehat et al.

(10) Patent No.: US 8,336,579 B2
(45) Date of Patent: Dec. 25, 2012

(54) EMERGENCY DISCONNECTION SYSTEM

(75) Inventors: Renaud Le Devehat, Thorigny-sur-Oreuse (FR); Anthony Loyer, Sens (FR)

(73) Assignee: FMC Technologies SA, Sens (FR)

( * ) Notice: Subject to any disclaimer, the term of this patent is extended or adjusted under 35 U.S.C. 154(b) by 747 days.

(21) Appl. No.: 11/990,241

(22) PCT Filed: Aug. 9, 2005

(86) PCT No.: PCT/FR2005/002060
§ 371 (c)(1),
(2), (4) Date: May 12, 2009

(87) PCT Pub. No.: WO2007/017559
PCT Pub. Date: Feb. 15, 2007

(65) Prior Publication Data
US 2009/0293969 A1  Dec. 3, 2009

(51) Int. Cl.
*F16L 37/36* (2006.01)
(52) U.S. Cl. .................. 137/614.06; 251/149.9; 285/365
(58) Field of Classification Search .................. 137/595, 137/614.05, 614.06, 614.11, 637.05; 251/149, 251/149.9; 285/1, 365, 408, 409, 411; 91/167 R
See application file for complete search history.

(56) References Cited

U.S. PATENT DOCUMENTS

| | | | | |
|---|---|---|---|---|
| 2,649,842 A | * | 8/1953 | Caldwell et al. | 91/167 R |
| 2,764,131 A | * | 9/1956 | Knights | 92/62 |
| 2,806,449 A | * | 9/1957 | Simmons | 91/167 R |
| 2,893,209 A | * | 7/1959 | Colley | 91/167 R |
| 3,015,935 A | * | 1/1962 | Evans | 91/167 R |
| 3,882,759 A | * | 5/1975 | Formwalt et al. | 91/167 R |
| 4,306,739 A | * | 12/1981 | Bormioli | 285/365 |
| 4,309,049 A | * | 1/1982 | Chevallier | 285/365 |
| 4,515,182 A | | 5/1985 | Le Devehat | |
| 4,622,997 A | * | 11/1986 | Paddington | 137/595 |
| 4,730,850 A | * | 3/1988 | Takahashi | 285/3 |
| 5,507,313 A | * | 4/1996 | LeDevehat | 137/614.05 |
| 5,533,435 A | * | 7/1996 | Kita | 91/519 |
| 5,586,482 A | * | 12/1996 | Leonard | 91/519 |
| 6,056,011 A | | 5/2000 | Bormioli | |
| 6,116,140 A | * | 9/2000 | Barthalow et al. | 91/167 R |

FOREIGN PATENT DOCUMENTS

| | | | |
|---|---|---|---|
| DE | 3229066 A1 | * | 3/1984 |
| EP | 0 080 136 A1 | | 6/1983 |
| EP | 175469 A1 | * | 3/1986 |
| EP | 0 287 046 A2 | | 4/1988 |
| GB | 2 162 270 A | | 1/1986 |

OTHER PUBLICATIONS

European Patent Office, Machine translation of EP0287046, Jun. 10, 2011.*
Translation of EP0287046A2, PTO 12-2501, European Patent Application, EP 0 287 046 A2, Robert Riche, Apr. 13, 1988.*

* cited by examiner

*Primary Examiner* — Kevin Lee
*Assistant Examiner* — Craig J Price (57) ABSTRACT

An emergency disconnection system for a fluid loading arm includes two valves, a collar which when closed secures the valves together and which when opened allows the valves to disconnect from each other, and an actuator which includes a single rod which is movable axially over a length of travel. A first jack moves the rod over a first portion of its travel to close the two valves and a second jack moves the rod over a remaining portion of its travel to open the collar. The first and second jacks are independently controllable and positioned substantially coaxially relative to each other.

21 Claims, 8 Drawing Sheets

EMERGENCY DISCONNECTION SYSTEM

BACKGROUND OF THE INVENTION

The present invention concerns emergency disconnection systems for loading systems, in particular for loading/unloading arms, for example for the transfer of liquefied natural gas.

More particularly, the invention concerns a system for emergency disconnection of a loading arm by means of two valves which are retained against each other using a collar.

Such disconnection systems are fully known from the state of the art, and there are several variants, described for example in the documents EP 0 748 429 B1 and U.S. Pat. No. 4,335,747.

In such a system, the disconnection procedure occurs in two steps: in a first phase, the valves are closed, and next the retaining collar is opened.

The closing of the valves and the opening of the collar are set off by one or more actuators. An actuator is a mechanical assembly adapted to operate the mechanisms for closing the valves and for opening the collar. These actuators must have a device for avoiding the opening of the collar before the valves have been fully closed, since this could have serious consequences (loss of part of the load, pollution, etc.). This device is termed an interlock in the technical field of the invention defined above.

A first type of emergency disconnection system comprises a first actuator for closing the valves and a second actuator (generally a hydraulic jack) for opening the collar. The opening of the collar is permitted by a hydraulic stop when the valves are closed. The security of the opening is thus managed by a hydraulic interlock. This type of interlock has several drawbacks: binding of the stop due to the corrosion induced by the sea air, the stop going out of adjustment during use.

If the hydraulic stop is not operational due to one of these problems, the opening of the collar cannot occur and the emergency disconnection system then becomes ineffective, which may prove dangerous.

The closing of the valves and the opening of the collar are moreover controlled therein by two dissociated solenoid valves which enables the valves to be closed without necessarily opening the collar, and to re-open the valves the case arising.

This system therefore makes it possible to perform a disconnection sequence in two steps that are independently controlled: closing of the valves, then opening of the collar.

Other types of disconnection systems comprise two jacks which are separate but integrated into the same actuator: a first jack for operating the valves and a second for opening the collar. These two jacks form an integral part of the actuator. This type of actuator has a mechanical interlock formed with two cams for example. It is thus impossible to operate the jack opening the collar while the valves are not completely closed. As in the preceding system, the closing of the valves and the opening of the collar are managed by two dissociated solenoid valves, which makes it possible to follow an emergency disconnection sequence in two independently controlled steps.

This system has drawbacks that are critical for emergency disconnection, in particular the high weight of the system, which, what is more, is situated at the end of the loading arm. Moreover, in certain embodiments, this system has the drawback of relatively slow actuation of the two separate jacks.

In addition, in certain embodiments, the second jack operates "empty" during the closing operation of the valves performed by the first jack.

A third type of system consists in closing the valves and opening the collar immediately after closing them. This type of system comprises a single jack actuator. The kinematics of the system are such that the jack closes the valves in a first phase and at the end of its travel, it enables the collar to be opened. Due to the kinematics of this actuator, it is impossible to open the collar without the valves being fully closed. The interlock is thus integrated into the actual kinematics of the system. However, this type of actuator does not enable the valves to be reopened once the disconnection procedure has been started, and in this case, the collar will necessarily be opened, since it is impossible to interrupt the travel of the jack until this has been completed, in particular on account of its inertia and construction. This type of system is described in particular in the document GB 2 162 270 A.

Here the disconnection sequence is controlled by a single solenoid valve.

However, in practice, a first alert threshold for the disconnection is set off. This first threshold corresponds to the closing of the valves. In case of higher risk, a second alert threshold is reached, and the opening of the collar is set off. If the second threshold is not reached, and the alert is cancelled, the valves are reopened and the loading procedure resumes.

Furthermore, this type of system is associated with a collar having two segments. A tie rod connecting those two collar segments is pivoted by the action of the jack at the end of travel, which makes it possible to free and to open those two segments. Thenceforth, the valves are no longer mechanically assembled and the emergency disconnection is achieved. However, this collar does not have a device for breaking the ice which would be formed around the collar during loading/unloading of cryogenic products, such as liquefied natural gas at approximately −165° C., as is the case on conventional collars with four radially opening segments. This ice which would be formed around the collar may prevent the two segments from completely opening despite the pivoting of the tie rod connecting the two segments under the action of the jack.

SUMMARY OF THE INVENTION

The invention aims to alleviate these drawbacks.

To that end, the invention provides an emergency disconnection system, in particular for a fluid loading arm, of the kind having two valves which are coupled using a collar with controlled opening, an actuator provided with a single rod, and single axis kinematics such that a movement of the rod over a first portion of its travel closes the two valves and over the remainder of its course, opens the collar, characterized in that the actuator comprises means adapted to ensure the movement of the rod over said two portions of travel and independently controlled over each of said portions, said means acting coaxially or substantially coaxially.

This system makes it possible to operate the two valves simultaneously and then open the collar in two separate independently controlled steps, all by a single rod. An advantage of this system also resides in the fact that it is possible to operate the valves in both the opening and the closing directions without opening the collar. Thus, the valves can be reopened after closing, for example in the case of a test of operation or of a first alarm threshold, without having to continue the disconnection procedure as far as the opening of the collar. Furthermore, the present invention enables the mechanism to be greatly simplified, compactness to be increased, and weight to be significantly saved, the weight of the members situated at the end of the arm being critical in this type of loading system.

Preferably, the actuator comprises two jacks nested within each other, and consequently two dissociated travels. The first travel corresponds to the closing of the valves and the second travel to the control for the opening of the collar. These two travels are controlled by two independent solenoid valves. It is thus possible to close the valves without opening the collar.

This specific actuator is thus a double-acting jack with a double effect which makes it possible to re-open the valves and which is provided with a second jack giving a supplementary travel. The actuator thus comprises three control apertures:

- an aperture for closing the valves,
- an aperture for opening the collar, which aperture is advantageously that of the hollow of the jack rod which enables the second jack to be pressurized,
- a third aperture for entirely retracting the jack rod and re-opening the valves.

Thus, according to another aspect which is original per se, the invention also relates to an actuator, in particular for an emergency disconnection system, comprising a first cylinder supplied by two apertures, between which is mounted a hollow piston serving as a cylinder to a second piston from which leaves a rod passing through said first and second cylinders to emerge from the actuator, the rod comprising a hollow passing all the way through which issues behind the second piston in the second cylinder in order to supply the latter.

The kinematics of this system makes it possible to operate the two valves of the emergency disconnection system simultaneously, then to open the collar, in two independently controlled steps.

In practice, the valves pivot within the pipes of the disconnection system, around two parallel and coplanar shafts situated in a median plane of the disconnection system. Each of these two shafts for rotation of the valves emerges at least at one of its ends outside the pipe whose valve it controls. The two emerging ends of the shafts are placed on the same side of the emergency disconnection system and are each connected to a control lever, two link bars connecting those control levers respectively mounted at the emerging end of each of the valve control shafts. One of the ends of one of the control levers is connected to one end of the actuator rod in line with the link bar for operating the corresponding valves. The translation of the actuator rod is transformed into rotation of the shaft of a valve by a system of movement transformation via the corresponding control lever, which transmits its rotational movement by link bars to the control lever of the shaft of the opposite valve. It is thus possible to operate the two valves simultaneously using the translation of the actuator rod. The range of travel of the closing mechanism of the valves corresponds to the first range of translation permitted by the actuator described above.

The mechanical link between the aforementioned end of the actuator rod and the first control lever for closing the valves is designed such that when the actuator has reached the end of its travel corresponding to the closing of the valves, an additional translation drives the end of the actuator and the control lever to separate. This supplementary translation corresponding to the second range of travel permitted by the actuator drives the end of the actuator rod into contact with a cam and tie rod system for retaining segments of a collar, and permits the opening of the latter, so causing the disconnection of the two valve bodies of the disconnection system.

The collar associated with this disconnection system is, preferably, a collar of the two segment type storing energy, by virtue of elastic means, at the time of its closing and releasing it at the time of the opening of the collar such that the elastic means cause the opening of the collar even if the latter is blocked by ice.

Preferably, the facing ends of the segments are connected in pairs respectively by two tie rods, one being fixed, and the other enabling the opening of the collar.

The latter tie rod advantageously has at each of its ends cams linked with the corresponding ends of each of the segments, constrained by elastic means, such as spring washers or springs, with which the collar is equipped. Thus, it is possible to arrange that a dead center must be passed during the pivoting of the tie rod under the action of the actuator rod. The crossing of this dead center enables any inadvertent disconnection of the system to be avoided.

Thus, according to still another aspect that is original per se, which may advantageously be combined with the preceding ones, the collar is of the kind with two segments connected together by tie rods of which one permits the opening of said collar and the other permits the pivoting of one segment with respect to the other, and in that said collar comprises elastic means operative between the segments and the bodies of the valves to ensure the full opening of the collar.

In other words, this coupling collar for coupling two fluid transport members comprises two segments connected together at their facing ends by two tie rods, one of said tie rods being designed so as to free the corresponding ends of the segments to open the collar and each of the segments comprising elastic means, here stacks of spring washers, which enable a certain quantity of elastic energy to be stored on closing the collar, and to release it on freeing two of the ends of the segments to ensure the opening of the collar in all circumstances.

It should finally be noted that the invention as defined above complies with the applicable standards in the field (OCIMF for "Oil Company International Marine Forum" and EN1474).

In general terms, the preferred features of the invention are the following:

- the means are adapted to ensure reversibility of the operation of closing the valves before the opening of the collar;
- the actuator is of the kind comprising two jacks nested one inside the other, and controlling the single actuator rod, the travel of the first jack corresponding to said first portion of travel of the rod and the travel of the second jack to the remaining portion of travel, each of the jacks being controlled by an independent solenoid valve;
- the collar is of the kind with two segments connected together by tie rods of which one permits the opening of said collar and the other permits the pivoting of one segment with respect to the other, and in that said collar comprises elastic means operative between the segments and the bodies of the valves to ensure the full opening of the collar;
- the first portion of travel corresponding to the control for the closing of the valves is at least equal to that corresponding to the opening of the collar such that, even when the control for actuating the second portion of travel is set off before the control for the first portion of travel, the valves will be closed before the opening of the collar due to the single-axis kinematics of said system;
- the elastic means take the form of spring washers disposed in bores provided for that purpose in the segments of the collar, perpendicularly to the median axis of the two valve bodies.
- the first jack is supplied by two apertures, between which a hollow piston is mounted serving as a cylinder to a second piston forming the second jack and from which the actuator rod leaves, which passes through said first and second jacks to emerge from the actuator;

said rod comprises a hollow passing all the way through which issues behind the second piston in the second jack in order to supply the latter; and the tie rod permitting the opening of the collar is provided with cams at each of its ends linked with the corresponding ends of each of the segments, one of the cams being formed as a finger bearing on the end of the corresponding segment, and in that in the closed position said tie rod comes to bear on a stop formed at said end of said segment of the collar, the latter being furthermore subject to stress by the elastic means with which it is equipped, such that a dead center must be passed by the finger on pivoting of the tie rod under the action of the actuator jack to open the collar.

Other features and advantages of the present invention will appear from the following description, given by way of non-limiting illustration, with reference to the accompanying drawings in which:

For reasons of clarity in the drawings, the different parts are not represented at the same scale.

DETAILED DESCRIPTION OF THE INVENTION

Figure 1:
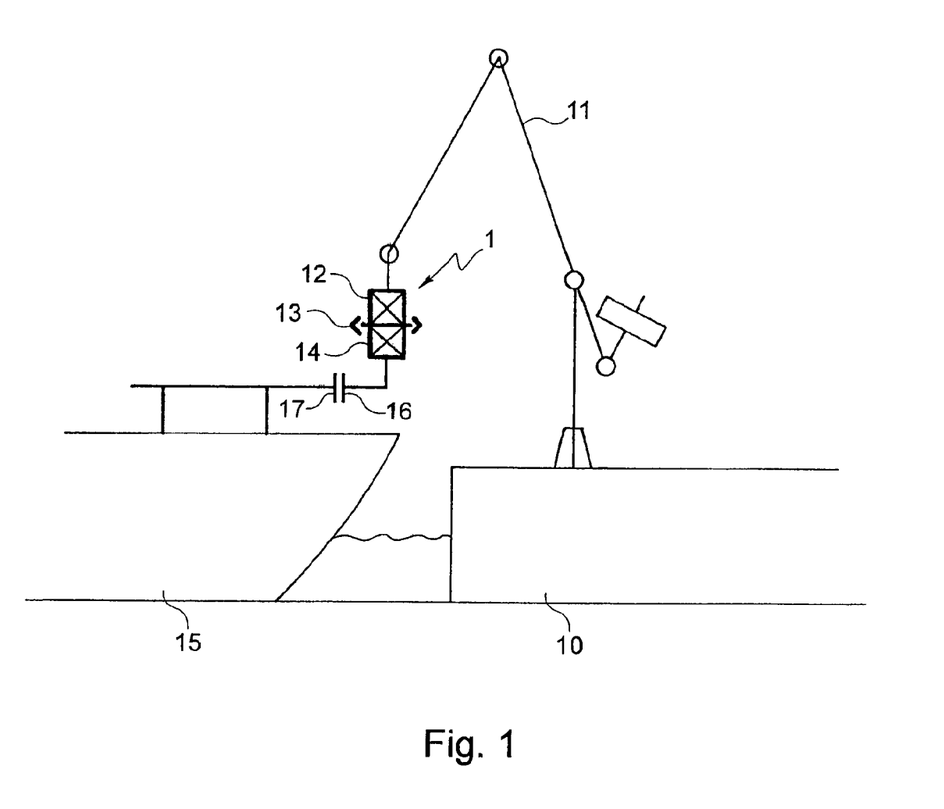
FIG. 1 is a schematic view of an emergency disconnection system according to the invention equipping a loading/unloading arm.

As can be seen schematically in FIG. 1, the emergency disconnection system 1 according to the invention is mounted at the end of a balanced arm 11 installed on a jetty 10. The system comprises two coupled valve bodies 12 and 14 held by a collar 13, the opening of which enables the emergency disconnection between a ship 15 and the jetty 10. The emergency disconnection system 1 is mounted on the arm 11 upstream of a hydraulic coupler 16 adapted to be connected to a manifold 17 provided on the ship 15.

Figure 2A:
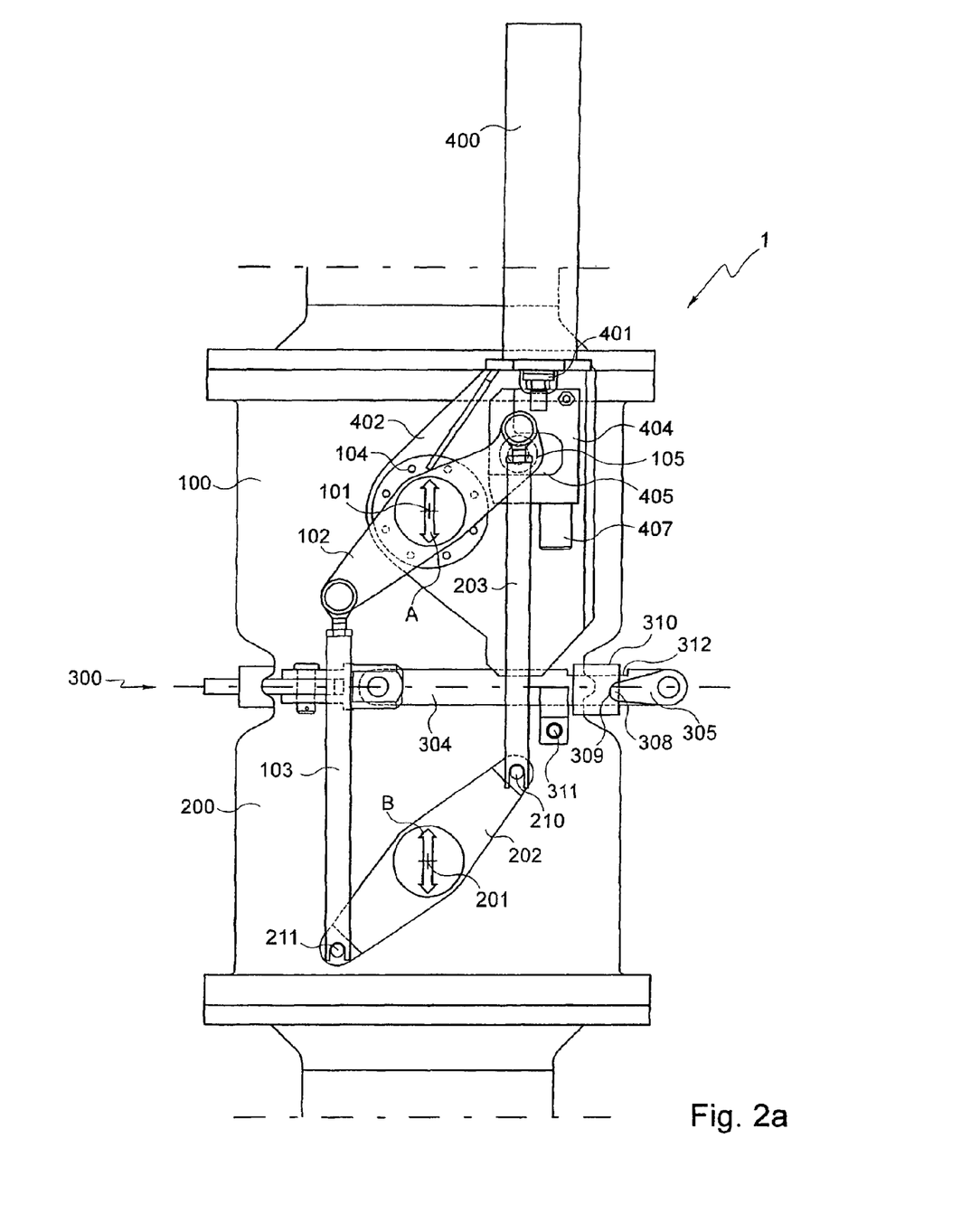
FIGS. 2A to 2C are views in profile of an emergency disconnection system according to the invention, respectively in open valve position, closed valve position, and collar open position.
Figure 2B:
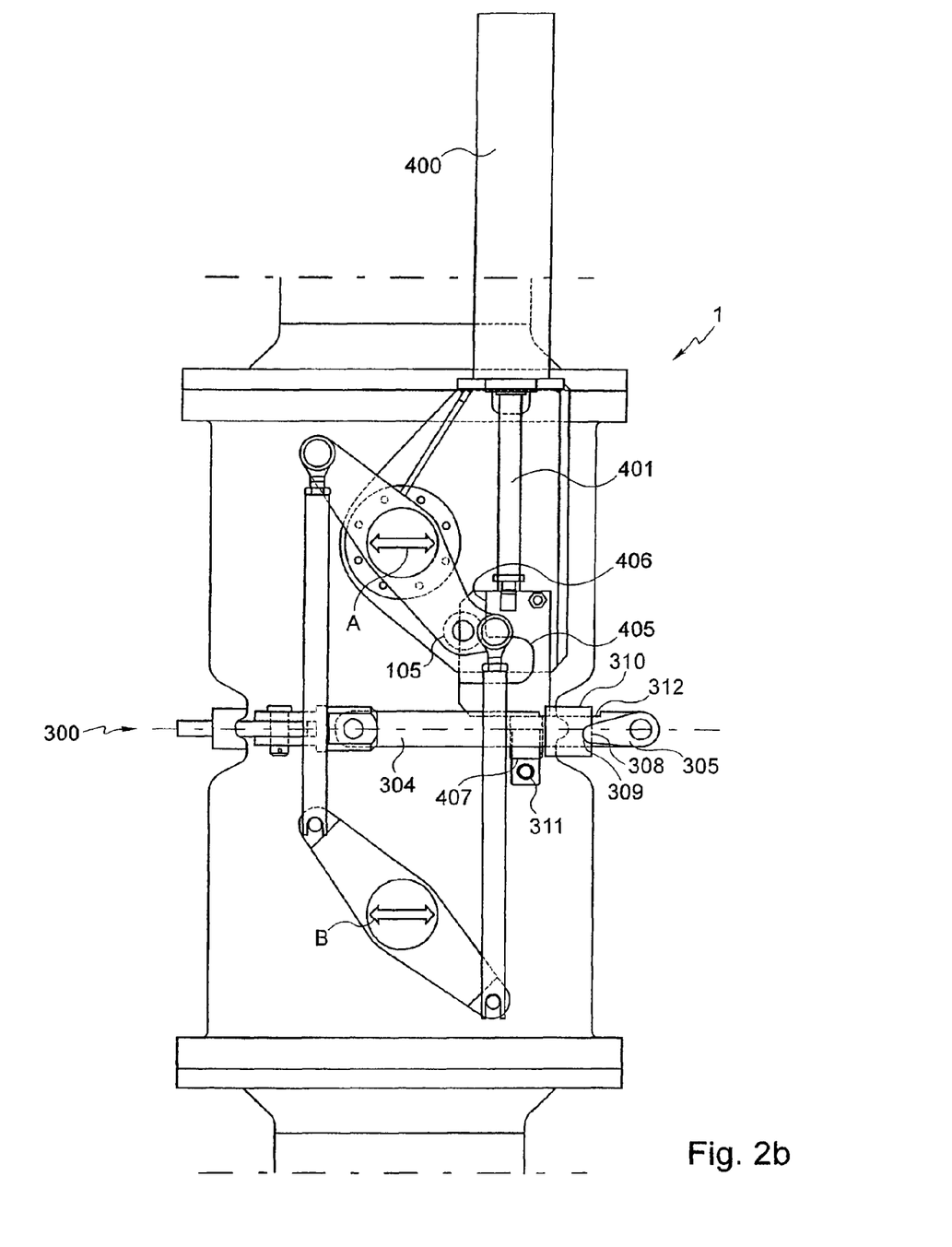
Figure 2C:
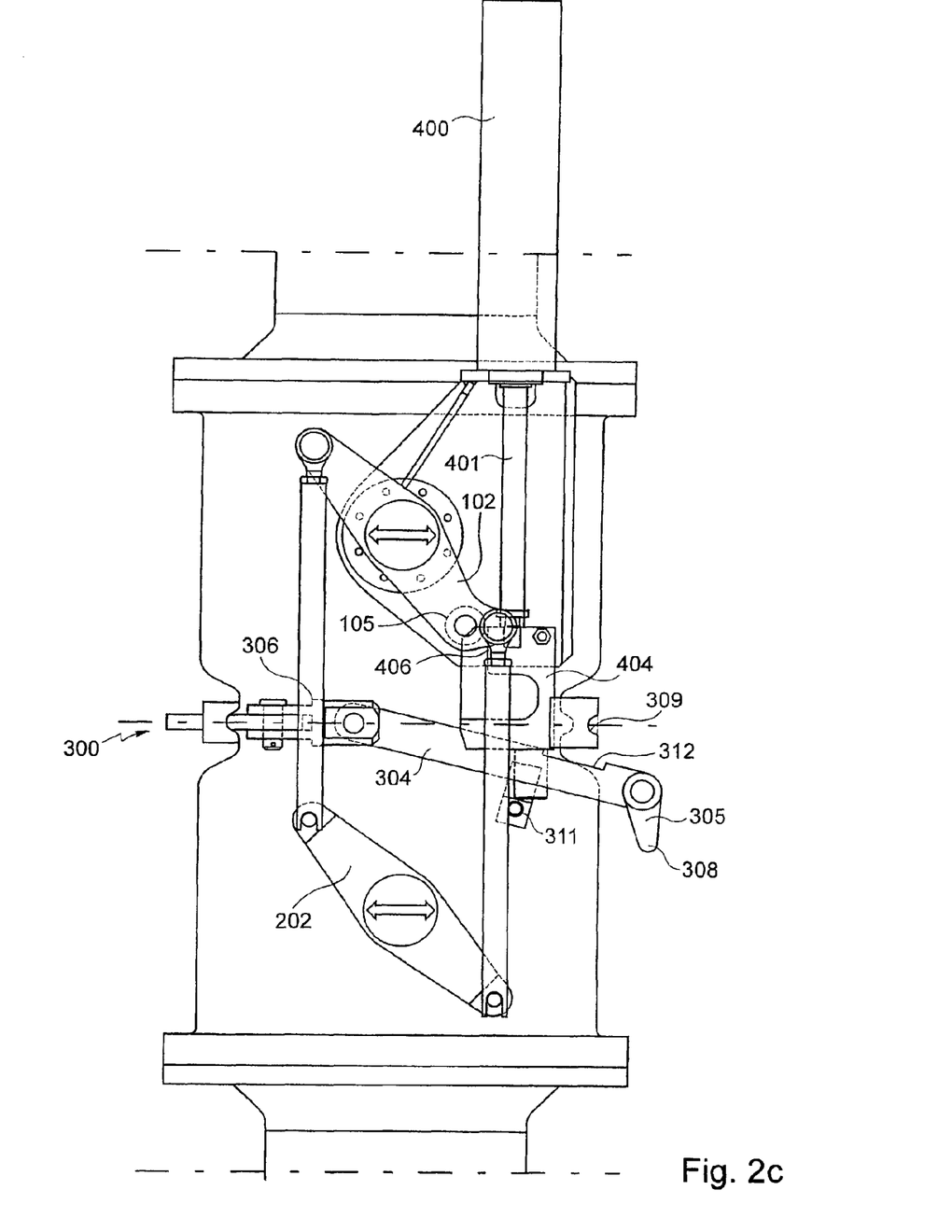

A preferred embodiment of the emergency disconnection system 1 according to the invention can be seen in more detail in FIGS. 2A to 2C.

This system comprises two valve bodies 100, 200 connected together by a collar 300.

The valves, not visible in FIGS. 2A to 2C, are respectively mounted within the bodies 100 and 200 on two shafts 101 and 201, themselves rotatably mounted with respect to the bodies 100 and 200. The position of the valves in the bodies 100 and 200 is symbolized by the double arrows A and B.

Each of the emerging ends of the shafts 101 and 201 is connected to a control lever 102, 202 fixed onto said shafts, in order to operate the valves.

The ends of the upper control lever 102 are respectively connected by parallel link bars 103, 203 to the ends of the corresponding lower control lever 202. The link bars are each mounted with a pivotal connection with the upper control lever 102 and each has a single degree of freedom with respect thereto.

The opposite ends of the link bars 103 and 203 are each provided with a recess of inverted "U" shape each of which is adapted to cooperate with one of the pins 210 and 211 disposed at the corresponding ends of the lower control lever 202. This assembly confers the link bars with at least two degrees of freedom with respect to the lower control lever 202: rotation and translation in a plane perpendicular to that of the rotation. Thus, at the time of an emergency disconnection, the link bars 103 and 203, connected to the upper valve body 100, can freely separate from the body 200 of the lower valve. This assembly thus makes it possible, due to its twin link bar design, to open and close the valves before the disconnection of the system, while ensuring the security of these latter.

The emergency disconnection system according to the invention further comprises an actuator 400 comprising a control rod 401 and mounted on a support plate 402 fixed to the upper valve body 100 via a support 104. The rod 401 is arranged parallel to the direction of the two link bars 103 and 203. A web 404 is connected to the end of the rod 401. This web is provided with a groove 405 in which a roller 105 slides which is mounted at one of the ends of the upper control lever 102. This system of a roller 105 sliding in a groove 405 makes it possible to transform the translational movement of the actuator 400 into rotational movement of the control lever 102, so enabling the valves of the system to be closed, as can be seen in FIG. 2B. When the rod 401 of the actuator 400 has accomplished sufficient travel to bring the valves into the closed position, represented by the arrows A and B in FIGS. 2B and 2C, a step formation 406 provided on the web 404 at the emergent upper end of the groove 405 enables the roller 105 to be freed, which enables the rod 401 to continue its downward translation, and to stop the rotation of the valve control levers. Since the step formation 406 is formed solely in the upper portion of the web 404, a reversal in translational movement of the rod 401 drives the valves, via the web 404, the groove 405 and the roller 105, to re-open.

As can be seen in FIG. 2C, continuation of the translation of the rod 401 downwards after freeing of the roller 105 brings a projection 407 provided at the lower end of the web 404 into contact with a pin 311 of the collar 300, by virtue of which the continuation of the translation causes the opening thereof as can be seen in FIG. 2C and the separation of the valve bodies 100 and 200 enabling emergency disconnection of the loading/unloading arm via the system 11.

One of the features of the present invention resides in the fact that the actuator 400 comprises a jack of particular design enabling the rod 401 to have two distinct and adjacent ranges of translation, the translation of the rod 401 over each of them being controlled by a separate solenoid valve. Furthermore, each of these two ranges of translation respectively corresponds, in a procedure of emergency disconnection, to the range for closing the valves up to the freeing of the roller 105 from the groove 405 and to the range for opening of the collar which follows the aforementioned freeing.

Figure 3A:
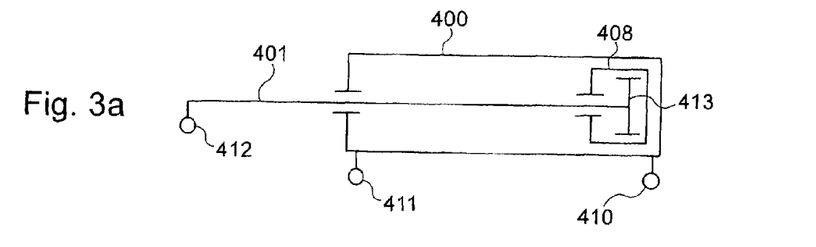
FIGS. 3A to 3C are schematic views of an actuator specific to the emergency disconnection system according to the invention.
Figure 3B:
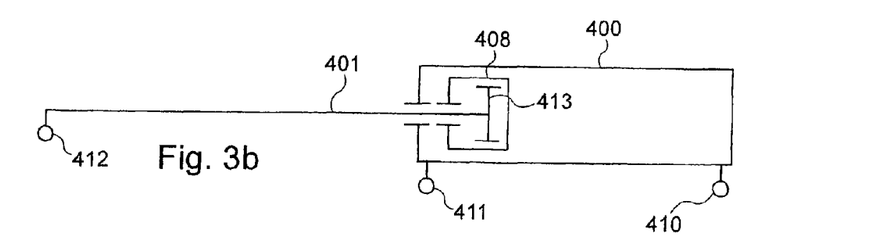
Figure 3C:
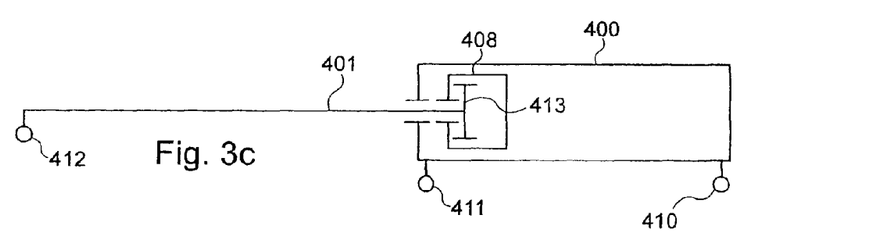

FIGS. 3A to 3C schematically represent such an actuator 400, its rod 401 being respectively located in the positions corresponding to FIGS. 2A to 2C.

This actuator 400 comprises a first piston 408 within which is disposed a second piston 413 connected to the rod 401 which passes through the body of the first piston 408 and of the actuator 400. This actuator 400 is equipped with three control apertures. The first aperture 410 is used for closing the valves. The application of hydraulic pressure to this aperture causes the displacement of the piston 408 from its position in FIG. 3A to its position represented in FIG. 3B, this travel, in the kinematics of the disconnection mechanism, corresponding to the travel necessary to close the valves, i.e. to the travel of the rod 401 represented between FIGS. 2A and 2B. The second aperture 411 serves for the opening of the valves, the application of pressure to this latter making the piston 408 return from its position represented in FIG. 3B to the position represented in FIG. 3A, these positions, in the kinematics of the mechanism, corresponding to the closing of the valves (see FIGS. 2A and 2B).

The third aperture 412 is used for the supply of the second piston 413 using a hollow (not shown) formed inside the rod 401. The application of hydraulic pressure to the aperture 412 enables the piston 413 to pass from its position represented in FIG. 3B to its position represented in FIG. 3C, which, in the kinematics of the disconnection system, corresponds to the travel enabling the collar 300 to be opened (see FIGS. 2B and 2C).

Each of the inlets 410, 411 and 412 is controlled by a separate solenoid valve, which makes it possible to independently control the displacement of the pistons 408 and 413 and thus to independently control the opening and closing of the valves and the opening of the collar 300, and to give a disconnection sequence in two independently controlled steps.

The disconnection system according to the invention thus has a mechanical interlock integrated into its kinematics, in that the latter does not enable opening of the collar 300 before the valves have been completely closed.

Figure 4:
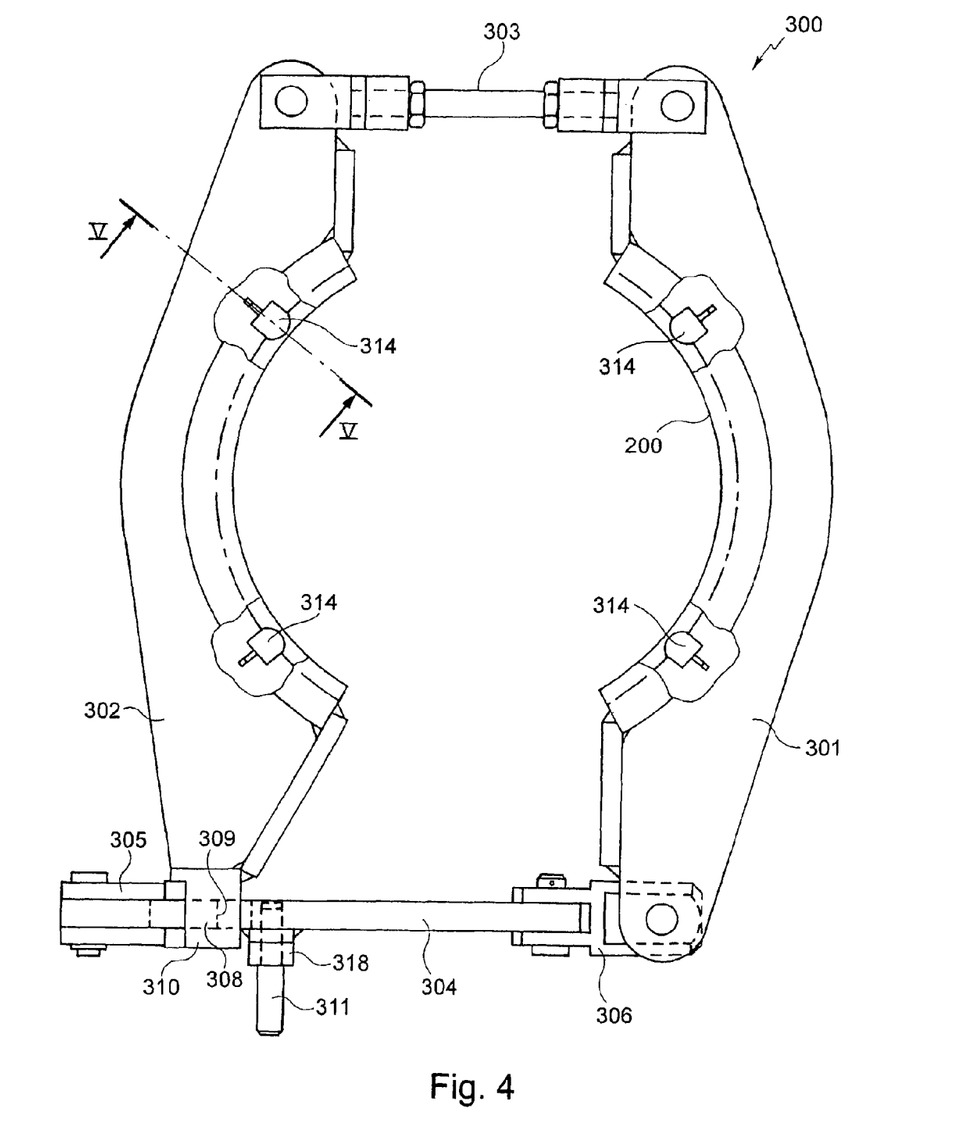
FIG. 4 is a view from above of a retaining collar for an emergency disconnection system according to the invention.

The disconnection is made possible by the use of a collar 300 composed of two segments 301 and 302, respectively connectively paired by two tie rods 303 and 304, one being fixed (303), the other (304) enabling the collar to be opened.

The first tie rod 303 referred to as fixed, is mounted in pivotal connection with one of the ends of the segments 301 and 302, in the plane formed by those two segments, so enabling them to pivot with respect to each other in that same plane.

The second tie rod 304 referred to as the opening tie rod, permits the emergency opening of the collar 300. It is provided at each of its ends with a cam 305, 306, each pivotally mounted thereon, in a plane perpendicular to the plane formed by the segments 301 and 302. One of the cams, 306, is pivotally mounted on the end of the corresponding segment, in the plane formed by the two segments. The other cam, 305, is formed as a finger 308 of which the end comes to bear on a hollow 309 provided on the outer side of the segment opposite the preceding one.

Each segment is preferably equipped with elastic means adapted to store energy, operative between the segment and the valve body so as to move the segments apart under all circumstances, in particular should ice have formed around the collar 300 on loading/unloading a cryogenic product, such as liquefied natural gas of which the temperature is approximately −165° C.

Here, each segment 301 and 302 respectively comprises two stacks of spring washers 307 disposed perpendicular to the axis of the valve bodies on said segments and which, when the collar 300 is closed, are compressed and enable energy to be stored. When the actuator 400 makes the tie rod 304 pivot, these washers release their energy instantaneously, which enables the ice which would have formed around the collar 300 to be broken. In this case, the mechanical separation of the valve bodies 100 and 200 is no longer hampered by the presence of ice and the separation may then occur properly and in perfect safety. This device enables energy to be stored in the collar 300 in order to break the ice on opening thereof.

Figure 5:
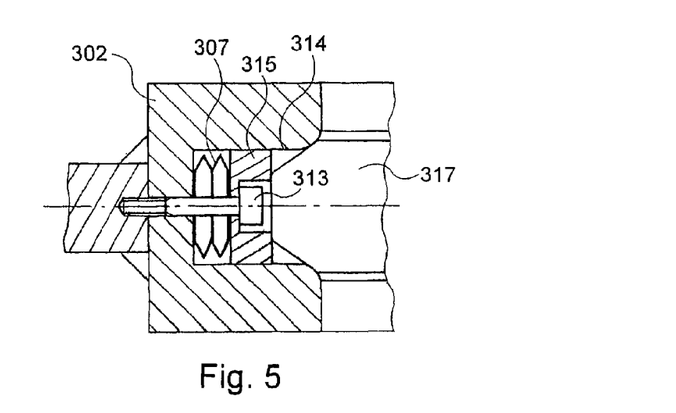
FIG. 5 is a section view on line V-V of FIG. 4, of a plunger according to the invention, in unstressed position.

FIG. 5 shows in detail, in the open position of the collar, a stack of spring washers 307, mounted in a blind bore 314 formed at the bottom of a hollow 317 in the segment, here 302. The washers 307 are retained at the bottom of the bore 314 by a plunger 315 itself retained by a screw 313 embedded in the body of the segment 302. The plunger 315 thus has one degree of freedom in translation with respect to the segment 302. The stacking of the spring washers 307 and their direction of mounting makes it possible to adjust the quantity of energy elastically stored in the collar 300 at the time of its closing. In closed position, each plunger 315 comes to bear against the valve body 100, 200, not shown in the drawings, and enables the energy stored to be freed on opening the collar 300, and drive the segments 301 and 302 apart.

By virtue of the cams 305 and 306 described above, not shown in FIG. 5, combined with the spring washers 307, the end of the finger 308 is pressed into the corresponding hollow 309. As can be seen in FIGS. 2a and 2b, the tie rod 304 has a slightly offset position with respect to the horizontal. The same applies for the cam 305. These offset positions are the result of the fact that the collar 300 is under stress, due to the action of the spring washers 307. Thus, a dead center must be passed during the pivoting of the tie rod 304 under the action of the actuator jack 400. This is because, as the pin 311 is mounted in a bearing 318 on the tie rod 304, the latter pivots when it enters into contact with the projection 407 of the web 404 mounted at the end of the rod 401 of the actuator 400. The crossing of this dead center enables any inadvertent disconnection of the system to be avoided. To avoid the tie rod 304 tipping to the other side, a recess 312 is provided thereon. When the collar is closed, the recess 312 comes to bear against a stop 310 provided at the corresponding end of the segment 302, in order to prevent the tie rod 304 tipping in the direction opposite to the direction of opening. This stop 310 in cooperation with the recess 312 ensures it is held in position, with a slight offset to the horizontal. On opening of the collar 300, the tie rod pivots, which drives the cam 305 to rotate about its shaft. When the point of resistance has been passed, tipping of the cam 305 into vertical position frees the collar.

In the preferred embodiment represented in particular in FIG. 4, it will be noted that the pin 311 is removably mounted in a bearing 318 provided for that purpose on the tie rod 304. In test phase, the withdrawal of the pin 311 enables the operation of the actuator 400 up to the end of travel to be tested without however opening the collar 300.

The present preferred embodiment of an emergency disconnection system according to the invention enables disconnection in two independently controlled steps: closing of the valves then opening of the collar, and, furthermore, a storage of energy in the collar to facilitate its opening should ice have formed around it during the transfer of cryogenic products.

In another embodiment of the invention, it could be envisaged to replace the actuator described above by another actuator such as shown in FIGS. 6A to 6C.

Figure 6A:
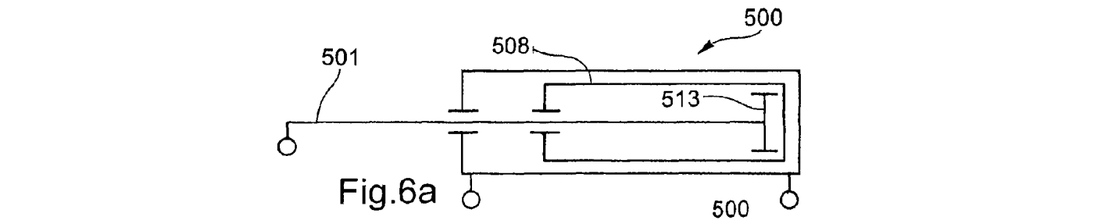
FIGS. 6A to 6C are schematic views of another actuator specific to the emergency disconnection system according to the invention.
Figure 6B:
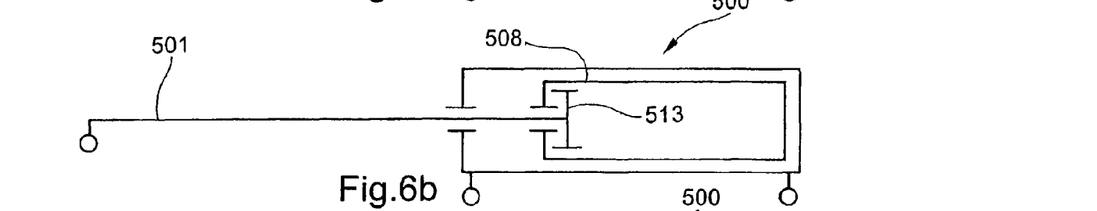
Figure 6C:
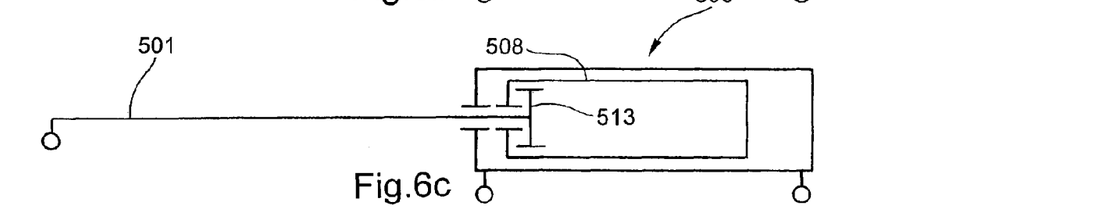

This actuator comprises a first piston 508 within which is disposed a second piston 513, connected to the rod 501, which passes through the body of the first piston 508 and of the actuator 500.

Just as for the actuator 400, this actuator 500 is equipped with three control apertures, operating on the same principle as the actuator 400, the main difference between the two actuators being that the travel for actuating the valves is provided by the inner piston 513 and the travel corresponding to the opening of the collar is provided by the second and outer piston 508, as can be seen in FIG. 6C.

Figure 7A:
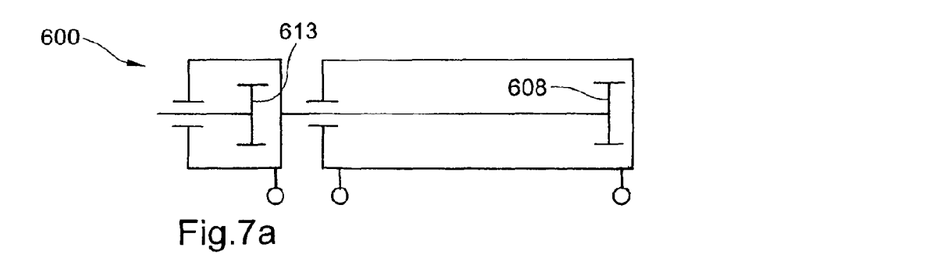
FIGS. 7A to 7C are schematic views of another actuator specific to the emergency disconnection system according to the invention.
Figure 7B:
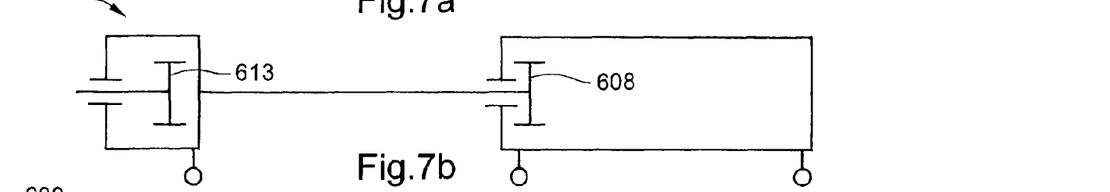
Figure 7C:
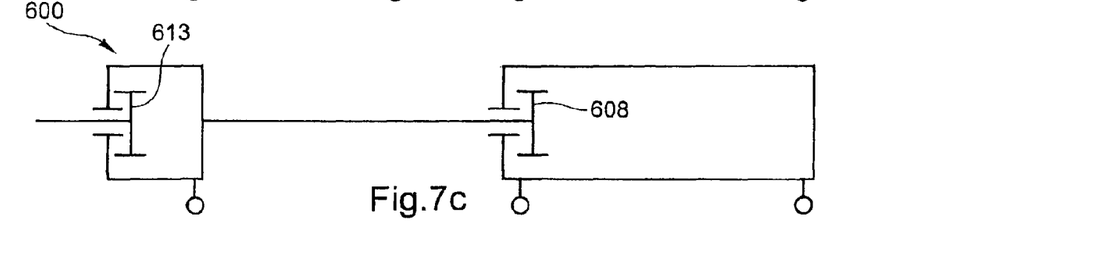

The use of another type of actuator such as can be seen in FIGS. 7A to 7C can also be envisaged. This actuator 600 comprises two single jacks 608 and 613, mounted one behind the other. The second jack 613 providing the opening of the collar is here a single-acting jack. The use of this actuator 600 enables standard commercially available jacks to be used.

Figure 8A:
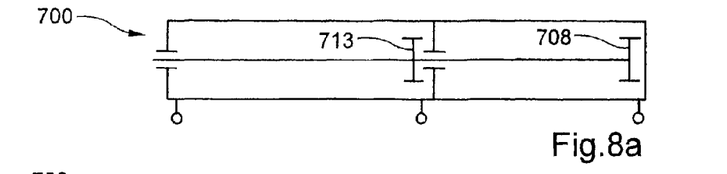
FIGS. 8A to 8C are schematic views of another actuator specific to the emergency disconnection system according to the invention.
Figure 8B:
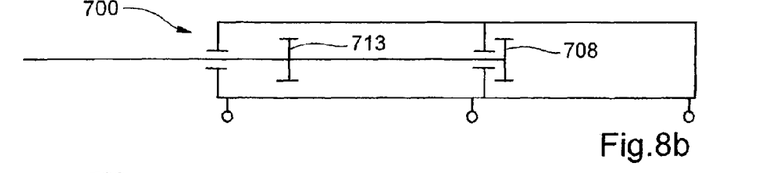
Figure 8C:
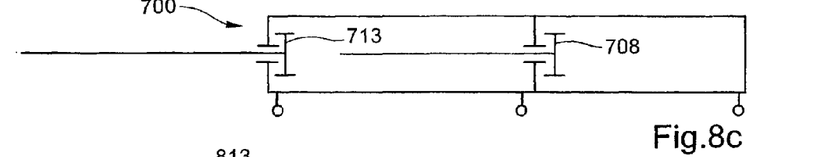
Figure 9A:
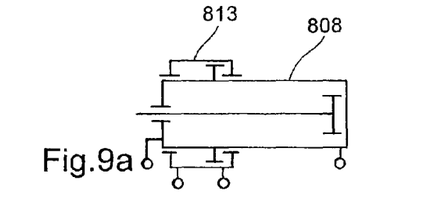
FIGS. 9A to 9C and 10A to 10C respectively show two variants of another actuator specific to the emergency disconnection system according to the invention.
Figure 9B:
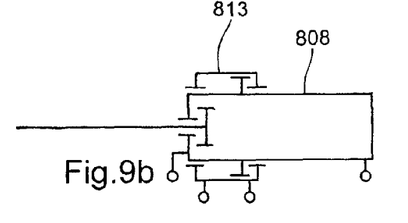
Figure 9C:
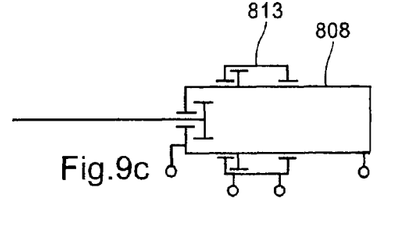
Figure 10A:
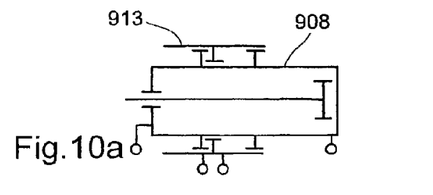
Figure 10B:
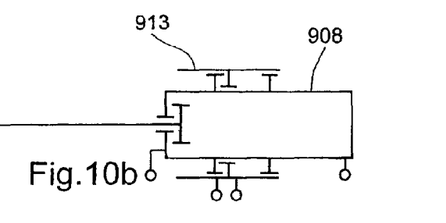
Figure 10C:
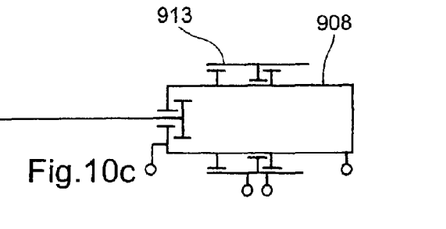

Another possible embodiment of an actuator specific to the invention is illustrated in FIGS. 8A to 8C. This actuator 700 is of the "tandem type", known elsewhere.

The actuator 700 thus comprises two jacks placed in series each comprising a piston (708, 713), the piston 708 providing the displacement of the jack rod as far as the closed position of the valves, and the piston 713 taking over as far as the opening of the collar as can be seen in FIG. 8C. This type of actuator has the advantage of a relatively simple construction, however the voluminosity of this actuator is greater than that of the actuators 400 and 500 described above.

Two other variants of an actuator specific to the disconnection system according to the invention can be seen respectively in FIGS. 9A to 9C and 10A to 10C. In this other embodiment, the actuator comprises 2 jacks, the first jack (808, 908) for operating the valves is an annular jack concentrically mounted on the second jack (813, 913) which enables the collar to be opened. The jack with reduced travel (813, 913) for the opening of the collar may in this configuration be a single-acting jack.

The present invention is not limited to the preferred embodiments described above but covers on the contrary all variant forms.

For example it could be envisaged to replace the actuators described above by any assembly of jacks able to provide the same functions, or a system with one or more racks providing the same functions as the present actuators.

It could also be envisaged to replace the spring washers described above by other elastic means, for example springs.

The invention claimed is:

1. An emergency disconnection system for a fluid loading arm which comprises:
   two valves;
   a collar which when closed secures the valves together and when opened allows the valves to disconnect from each other;
   an actuator which comprises a single rod which is movable axially over a length of travel, first means for moving the rod over a first portion of its travel to close the two valves and second means for moving the rod over a remaining portion of its travel to open the collar;
   wherein the first and second means are independently controllable and are positioned substantially coaxially relative to each other; and
   wherein the collar comprises first and second segments which each comprise first and second ends, a first tie rod which in the closed position of the collar is positioned between the first ends of the segments and which permits the opening of the collar, a second tie rod which is positioned between the second ends of the segments and which permits the pivoting of the segments relative to each other, and elastic means operative between at least the first segment and at least one of the valves to bias the collar toward its open position.

2. A system according to claim 1, wherein the first means is operable to re-open the valves prior to operation of the second means.

3. A system according to claim 1 wherein the first means comprises a first jack which controls the movement of the rod over the first portion of its travel, the second means comprises a second jack which controls the movement of the rod over the remaining portion of its travel, and the first and second jacks are nested one inside the other.

4. A system according to claim 1, wherein the first portion of travel is at least as long as the remaining portion of travel such that, if the second means is actuated before the first means, the valves will nevertheless be closed before the collar is opened.

5. A system according to claim 1, wherein the elastic means comprises a number of spring washers which are disposed in corresponding bores in at least the first segment perpendicular to the median axis of the two valves.

6. A system according to claim 3, wherein the first jack is supplied by two apertures, between which a hollow piston is mounted which serves as a cylinder to a second piston that forms the second jack and from which the actuator rod extends and passes through said first and second jacks to emerge from the actuator.

7. A system according to claim 6, wherein said rod comprises an axial bore extending therethrough and exiting behind the second piston in the second jack in order to supply the latter.

8. A system according to claim 1, wherein the first tie rod comprises:
   cams at each of its ends, each cam being linked with a corresponding first end of the segments, one of the cams being formed as a finger bearing on its corresponding first end;
   wherein in the closed position of the collar said first tie rod comes to bear on a stop formed at said corresponding first end; and
   wherein the finger passes through a dead center position on pivoting of the first tie rod by the second moving means to open the collar.

9. An emergency disconnection system for a fluid loading arm which comprises:
   two valves;
   a collar which in a closed position secures the valves together and in an open position permits the valves to be moved apart; and
   an actuator which comprises an elongated control rod, first means for extending the control rod axially from a first position to a second position to thereby close the valves, and second means for extending the control rod axially from the second position to a third position beyond the second position to thereby open the collar;
   wherein the first and second means are controllable independently of each other; and
   wherein the collar comprises first and second arcuate segments which each comprise first and second ends, a first tie rod which pivotally connects the first ends of the arcuate segments together, a second tie rod which releasable connects the second ends of the arcuate segments together, and means positioned between at least one of the first and second segments and at least one of the valves for biasing the collar toward its open position.

10. The emergency disconnection system of claim 9, wherein the first means comprises a first piston and the second means comprises a second piston.

11. The emergency disconnection system of claim 10, wherein the second piston is positioned within the first piston and is connected to the control rod.

12. The emergency disconnection system of claim 11, wherein the actuator further comprises:
- a first control aperture through which hydraulic fluid is supplied to move the first piston and thereby the control rod from the first position to the second position;
- a second control aperture through which hydraulic fluid is supplied to move the first piston and thereby the control rod from the second position to the first position; and
- a third control aperture through which hydraulic fluid is supplied to move the second piston and thereby move the control rod from the second position to the third position.

13. The emergency disconnection system of claim 12, wherein the third control aperture communicates with a bore which extends axially through the control rod to a space between the first and second pistons.

14. The emergency disconnection system of claim 10, wherein the first piston is connected to the control rod and is positioned within the second piston.

15. The emergency disconnection system of claim 10, wherein the first and second pistons are positioned axially in tandem, the first piston is connected to a piston rod which engages the second piston, and the second piston is connected to the control rod.

16. The emergency disconnection system of claim 9, wherein the first and second means comprise respective first and second jacks which are positioned axially in tandem, and wherein the first jack is connected to the second jack and the second jack is connected to the control rod.

17. The emergency disconnection system of claim 9, wherein the first and second means comprise respective first and second jacks which are positioned concentrically, and where the first jack is connected to the control rod and the second jack is connected to the first jack.

18. The emergency disconnection system of claim 9, wherein the biasing means comprises a number of spring washers which are positioned in corresponding bores in the at least one of the first and second segments.

19. The emergency disconnection system of claim 1, wherein the first moving means comprises a first jack, the second moving means comprises a second jack, and each of said jacks comprises a piston, and wherein the actuator comprises three control apertures for controlling the movement of the pistons, the three control apertures including a first aperture which is used for closing the valves, a second aperture which is used for opening the collar and a third aperture which is used for retracting the rod and reopening the valves.

20. In combination with a fluid loading arm which is mounted at a first location and which comprises a hydraulic coupler that is connectable to a manifold at a second location, the improvement comprising an emergency disconnection system which is positioned in the fluid loading arm between the first location and the hydraulic coupler and which comprises:
- first and second valves which are connected to corresponding portions of the fluid loading arm;
- a collar which in a closed position secures the valves together and in an open position permits the valves to be moved apart; and
- an actuator which comprises an elongated control rod, first means for extending the control rod axially from a first position to a second position to thereby close the valves, and second means for extending the control rod axially from the second position to a third position beyond the second position to thereby open the collar;
- wherein the first and second means are controllable independently of each other; and
- wherein the collar comprises first and second arcuate segments which each comprise first and second ends, a first tie rod which pivotally connects the first ends of the arcuate segments together, a second tie rod which releasably connects the second ends of the arcuate segments together; and means positioned between at least one of the first and second segments and at least one of the valves for biasing the collar toward its open position.

21. The combination of claim 20, wherein the biasing means comprises a number of spring washers which are positioned in corresponding bores in the at least one of the first and second segments.

* * * * *